United States Patent
Reutter

(10) Patent No.: US 6,729,271 B1
(45) Date of Patent: May 4, 2004

(54) CLOSURE CAP FOR A MOTOR VEHICLE RADIATOR

(76) Inventor: Heinrich Reutter, Theodor-Heuss-Strasse 12, D-71336 Waiblingen (DE)

( * ) Notice: Subject to any disclaimer, the term of this patent is extended or adjusted under 35 U.S.C. 154(b) by 0 days.

(21) Appl. No.: 09/926,535

(22) PCT Filed: May 22, 2000

(86) PCT No.: PCT/EP00/04661
§ 371 (c)(1),
(2), (4) Date: Feb. 13, 2002

(87) PCT Pub. No.: WO00/71872
PCT Pub. Date: Nov. 30, 2000

(30) Foreign Application Priority Data

May 22, 1999 (DE) .......................... 199 23 775

(51) Int. Cl.[7] .................................................. F01P 3/22
(52) U.S. Cl. ................................ 123/41.54; 220/203.23
(58) Field of Search .................. 123/41.54; 220/203.23, 220/203.26

(56) References Cited

U.S. PATENT DOCUMENTS 5,248,052 A * 9/1993 Mellinger et al. ........ 123/41.54

FOREIGN PATENT DOCUMENTS

| DE | 1931736 | 11/1965 |
|---|---|---|
| DE | 3320338 A1 | 12/1984 |
| DE | 4107525 C1 | 5/1992 |
| DE | 4233913 A1 | 4/1994 |
| DE | 29610724 U1 | 3/1997 |
| DE | 19705036 A1 | 8/1998 |
| DE | 19753597 A1 | 6/1999 |
| EP | 0287450 A1 | 10/1988 |
| JP | 8-100654 | 4/1996 |
| WO | WO 95/32904 | 12/1995 |

* cited by examiner

Primary Examiner—Noah P. Kamen
(74) Attorney, Agent, or Firm—Bacon & Thomas, PLLC; Felix J. D'Ambrosio

(57) ABSTRACT

A closure cap for a fixed neck of a container, especially of a motor vehicle radiator. The closure cap comprises a cap inner part provided with a flow connection between the inside of the container and the outside of the container. The cap inner part includes a valve assembly for releasing and blocking the flow connection. The valve assembly includes a valve body is able to move in a to-and-fro manner. It is pressed with a bias in a direction toward the interior of the container against a sealing seat. The valve body is biased so that it can lift from the sealing seat when a limiting value of the inner pressure of the container is surpassed. The bias can be adjusted by a drive controlled by the operation of the vehicle.

26 Claims, 7 Drawing Sheets

CLOSURE CAP FOR A MOTOR VEHICLE RADIATOR

FIELD OF THE INVENTION

The present invention relates to a closure cap for a stationary connector of a container, in particular a motor vehicle radiator having an interior cap element, which has a flow connection between the container interior and the container exterior, and a valve arrangement for opening and blocking the flow connection, wherein a valve body, which can be moved back and forth is pushed with a bias in the direction toward the container interior against a seal seat on the interior cap element so that it can lift off the seal seat when a threshold value of the interior pressure in the container is exceeded.

BACKGROUND OF THE INVENTION

In connection with known closure caps, for example for motor vehicle radiators, the valve body of the valve arrangement is constantly charged in such a way that the flow connection between the radiator interior and the radiator exterior is opened after a defined threshold value of the interior radiator pressure has been exceeded. This then results in the discharge of air interspersed with coolant water. Such simple closure caps provide a pressure equalization during the operation of the motor vehicle at the time when the pressure in the radiator increases, caused by the heating of the cooling water, and a critical pressure value has been reached or exceeded. This is a safety aspect. However, in motor vehicles the overpressure also rises because of residual heat when the vehicle is stopped, i.e. the engine has been shut down, so that in connection with the simple closure cap mentioned a complete opening also takes place and the danger arises that a large amount of cooling water escapes, or evaporates, or the radiator even boils empty, so that cooling water must be frequently replenished. Multistage closure caps were therefore developed (DE 41 07 525 C1), which release the overpressure created by the residual heat in other ways than an essentially higher overpressure occurring because of a malfunction. However, such a closure cap is relatively elaborate because of several valve body elements, which can be moved in respect to each other, and because of several sealing and counter-sealing surfaces. Moreover, cooling water is also sprayed out in the course of this pressure relief in case of an overpressure caused by residual heat after the vehicle engine has been shut off. An absolute loss of water can in this case only be prevented if a compensating reservoir for catching the fluid is installed, or an additional recirculating pump is used, which prevents a pressure increase after shut-down by recirculating the coolant. But this is also elaborate.

SUMMARY OF THE INVENTION

It is therefore an object of the present invention to provide a closure cap of the type mentioned at the outset, by means of which, on the one hand, an opening in case of overpressure caused by residual heat is prevented in a simple and cost-efficient manner and, on the other hand, it remains assured that the container is protected during further increase in pressure.

To attain this object in connection with a closure cap of the type mentioned at the outset the bias with which the valve body is pressed against the seal seat can be set by means of a drive mechanism controlled by the vehicle operation.

By means of the measures of the invention it has been achieved that it is possible to control the bias of the valve body, for example as a function of the operation of a motor vehicle, in such a way that the closure cap does not open in case of a defined overpressure caused by residual heat. By means of this the discharge of air mixed with cooling water is prevented during this "operational phase". There is no need here for additional components, such as a compensating container or a recirculating pump. The overpressure can be caused by cooling of the vehicle radiator during stops. In spite of this, the closure cap will open during a continued pressure increase beyond a defined safety limit in order not to endanger the cooling system by bursting, occurring leaks, also in connecting hoses. For example, the bias can be set in two stages, i.e. to an opening pressure corresponding to normal operations, and a higher opening pressure, which takes into consideration the pressure increase through residual heat. The setting of the bias for the valve body can take place in that the drive mechanism for biasing the valve body is vacuum-controlled, or in that the drive mechanism for biasing the valve body is electro-thermally controlled in different ways. If the bias is controlled by vacuum, the control value can be picked up directly from the engine compartment of spark ignition engines, or Diesel engines. If, however, an electrical signal is provided, it can be directly derived, for example from the operating state of the ignition.

Exemplary embodiments in regard to the mechanical biasing of the valve body ensue in that on the side facing away from the drive mechanism, the valve body is biased by means of a spring, or in that on its end facing away from the valve body the spring is supported on a pressure member, which is axially movable by means of the controlled drive mechanism.

The drive mechanism itself can be embodied in various ways, such as the controlled drive mechanism has an element, which transfers the drive motion to the pressure member, the drive mechanism is constituted by an arrangement, which has a spring-loaded diaphragm, whose axial movement biases the valve body, or the drive mechanism has an element which can be expanded by heat and is arranged axially flush with the pressure member show by way of examples. While in the first case a mechanical piston reacting to a vacuum is provided, and in the second case a diaphragm arrangement which can be moved by a vacuum, in the third case an electric drive mechanism in the form of an electrically heatable expansion element is provided.

Embodiments regarding the individual types of drive mechanisms ensue when the controlled drive mechanism is constituted by a piston-cylinder unit, whose piston is maintained between two springs at the ends and is provided with a ramp facing the pressure member, with a roller element arranged between the ramp of the piston and the pressure member, or when the pressure member is clamped, axially movable, by means of the diaphragm between the exterior element and exterior thread element and is biased by means of a compression spring supported on the handle, with a vacuum-controlled drive mechanism which can be or is connected with a hose leading to the engine, or when the drive mechanism has an element which can be expanded by heat and is arranged axially flush with the pressure chamber, the drive mechanism constituting an electrically heatable expansion material element, or an electrically heatable sorption actuator, preferably a metal hydride actuator, with the drive mechanism being provided with a PCT heating element, or when the drive element has a bellows in which the element which can be expanded by heat is arranged.

The handle is provided with a fixed hose connection element so that a fixed connection between the vacuum hose and the closure cap is provided. It is advantageous to design the release from, or screwing on, of the closure cap on the container connector in accordance with a ratchet-like rotary connecting device is provided between the handle and the exterior thread element, which can be set as a function of the direction of rotation, or in that the ratchet-like rotary connecting device is axially arranged, or in that the ratchet-like rotary connecting device is radially arranged or in that the ratchet-like rotary connecting device has a coupling bolt, which is maintained resiliently movable in its axial direction in a recess of the handle, or in that one side of the end of the coupling bolt which enters into the exterior thread element is provided with an inclined face and can be rotated in its recess, preferably over an angle of +/−180°, or in that the coupling bolt is connected, fixed against relative rotation, with a rotary lever, or in that the exterior thread element has a collar with bores, which can be engaged by the coupling bolt.

In a further embodiment, characterized in that a torsion protection device, which is controlled as a function of temperature, is arranged between the handle and the exterior thread element, or characterized in that the torsion protection device has a hoop, which is connected to move together with the drive mechanism and has end fingers which penetrate into the cutouts of the exterior thread element, or characterized in that the hoop is coupled to move together with the bellows of the drive mechanism, or characterized in that the bellows is acted upon by a spring, or characterized in that the torsion protection device is integrated into the ratchet-like rotary connecting device the closure cap is connected with a torsion protection device controlled as the function of temperature which prevents the closure cap from being unscrewed from the container connector in an operating state of too high a temperature.

DESCRIPTION OF THE PREFERRED EMBODIMENTS

Figure 1:
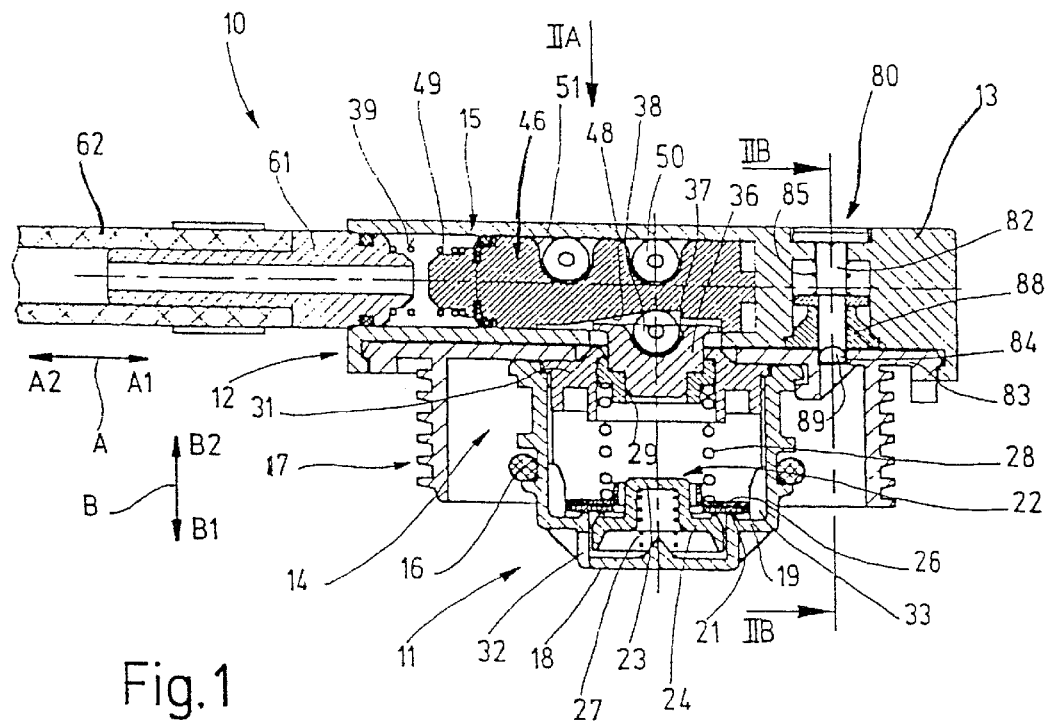
FIG. 1, is a schematic representation in longitudinal section (along line I—I of FIG. 2A) of a closure cap for motor vehicle radiators in accordance with a first exemplary embodiment of the present invention in a first position.

The closure cap 10, 110, 210, or 310, represented in the drawings in accordance with four exemplary embodiments has a pressure-relief valve arrangement 11 and is actuated in such a way that the opening pressure of the pressure-relief valve arrangement 11 can be set in two stages by means of a drive mechanism 15, 115, 215, or 315, namely to an opening pressure, which takes the motor vehicle radiator overpressure during normal operations into consideration, and an opening pressure which corresponds to the higher motor vehicle radiator overpressure resulting because of the residual heat when the motor vehicle engine has been turned off.

Figure 2A:
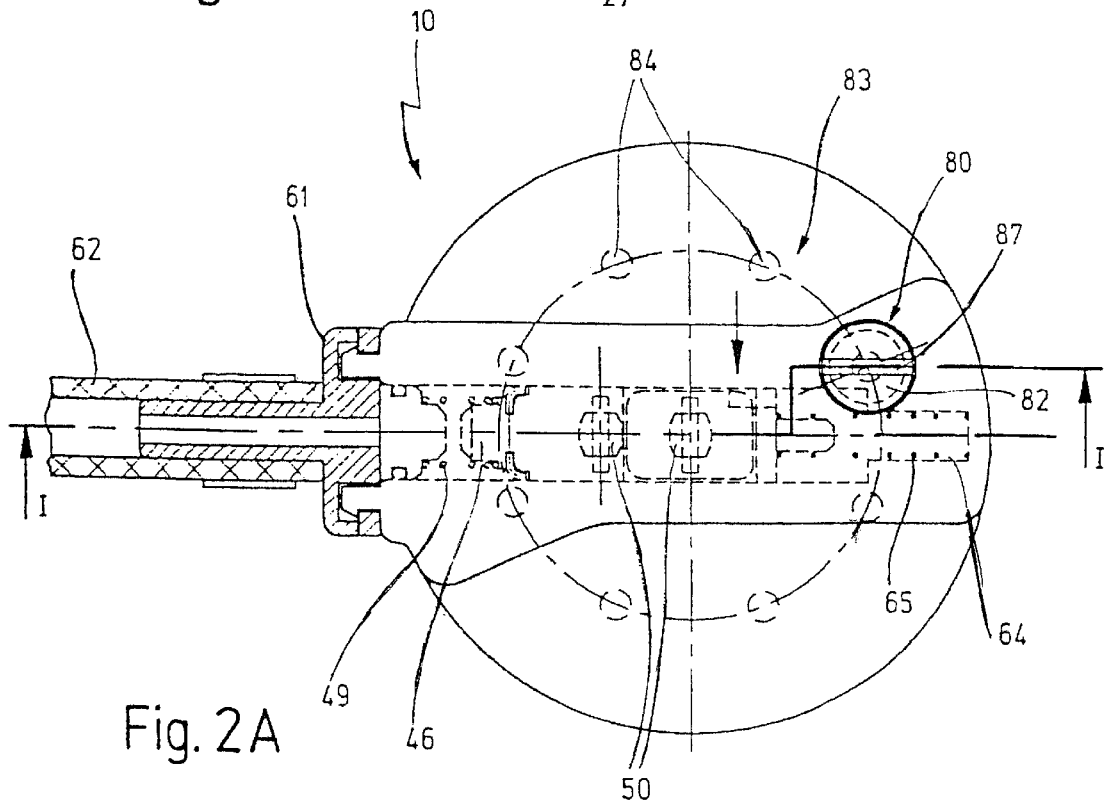
FIGS. 2A and 2B, are partial sectional views from above in accordance with the arrow IIA in FIG. 1, or a section along the line IIB—IIB in FIG. 1, FIGS. 3A and 3B, are perspective plan views, or a partial sectional lateral view, of a closure cap for motor vehicle radiators in accordance with a second exemplary embodiment of the present invention.
Figure 2B:
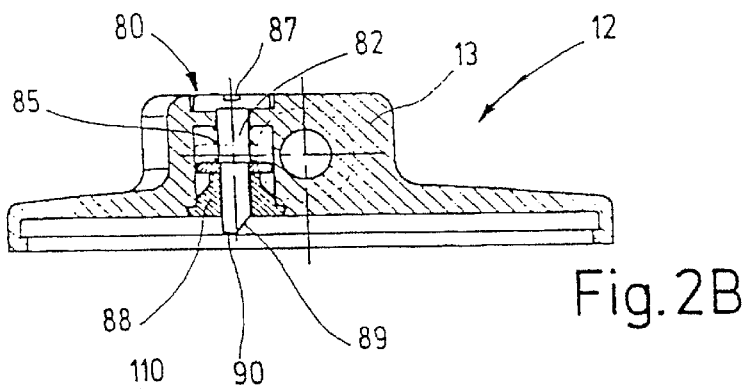
Figure 3A:
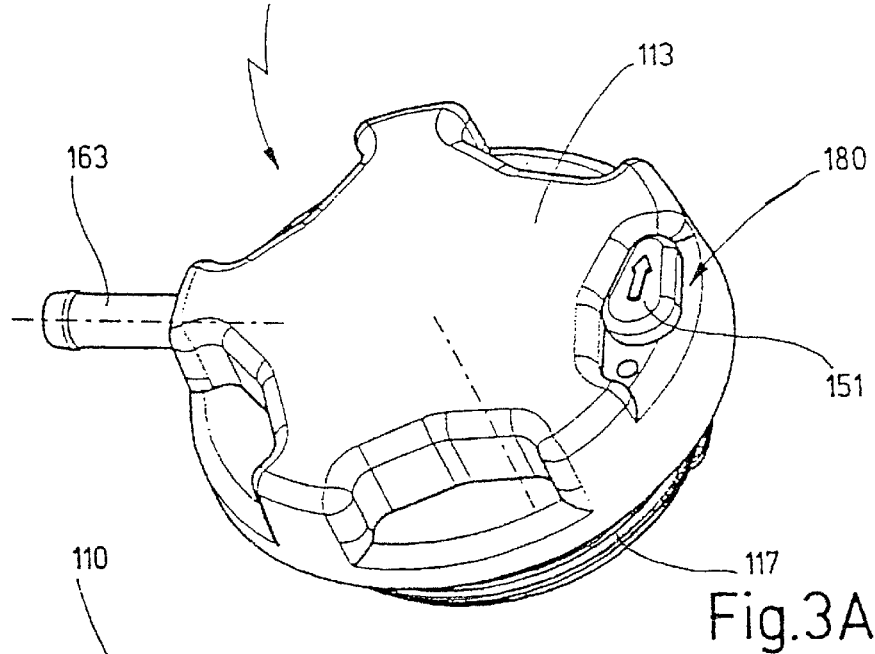
Figure 3B:
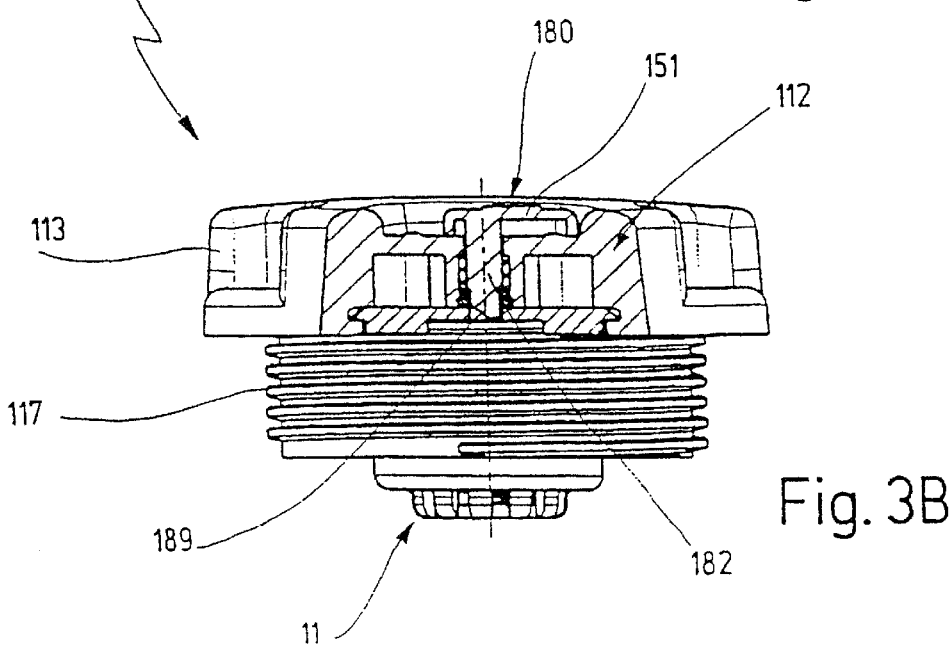

In accordance with FIGS. 1, 2A and 2B, the closure cap 10 has an exterior element 12 with a handle 13 and an exterior thread element 17 for screwing the closure cap 10 on and off the opening of a connector of a motor vehicle radiator, not represented, or other container, and an interior element 14, which can be sealingly inserted by means of an O-ring 16 into the connector of the motor vehicle radiator, or other container, and is maintained on the exterior element 12. The handle 13 is rotatably and rigidly or lockably connected with the exterior thread element 17, wherein a torsion protection device can be provided, which operates by applying pressure, but preferably as a function of the temperature. It is understood that the exterior element 12 can also be provided with a bayonet closure element in place of an exterior thread element 17.

The cylindrically embodied interior element 14 of the closure cap 10 is equipped with a pressure-relief valve arrangement 11. It has a bottom 18 and above the bottom an inward projecting annular rim 19, whose upper area is provided with a seal seat 21 for the valve body 22 of the pressure-relief arrangement 11. The valve body 22 has a centered hat-shaped part 23, on whose circumferential flange 24 a seal disk 26 rests. The hat-shaped part 23 is supported via a spring support 27 on the bottom 18. A compression spring 28, or pressure-relief valve spring, acts on the seal disk 26 and is supported on the other end on a sleeve 29, which is guided, axially movable up and down, in an axial stop 34 for the guide cylinder 31 having the sleeve 29. The guide cylinder 31 is fastened on the end of the interior element 14 which faces away from the valve body 22. Openings 32, which point into the motor vehicle radiator, or container, are provided on the bottom. The interior element 14 moreover has openings 33, which are located on the exterior circumference, are of a lesser diameter and are connected with the exterior atmosphere. With the valve body 22 lifted off the seal seat 21, a flow connection between the radiator, or container interior, and the exterior air results.

A pressure member 36 is received in the sleeve 29 in a motionally connected manner, whose other end projects into a chamber 39 in the exterior element 12 and has a roller or cylinder receiver 37. A roller, or a cylinder 38 is seated, or inserted, freely rotatable in this receiver 37 of the pressure member 36. The cylinder 38 lies at least partially inside the cylindrical chamber 39, which is horizontal here and can be sealingly closed at its open end with the aid of an easily removable coupling element 61, on which a hose 62 leading to the motor, for example, is fastened. A piston 46 is guided inside the cylinder chamber 39 and is movable back and forth in the direction of the two-headed arrow A, and therefore perpendicularly in respect to the movement of the pressure member 36 in accordance with the two-headed arrow B. A shifting spring 49 (FIG. 2A) is provided between the coupling element 61 and the oppositely located end of the piston 46. The end 63 of the piston 46 facing away from the coupling element 61 is guided in a blind bore 64 at the other end of the handle 13. The end of the piston 46 of lesser diameter is enclosed in a compression spring 65, whose other end is supported on the bottom of the blind bore 64. Facing the pressure member 36, the piston 46 has a ramp 48, against which the cylinder 38 of the pressure member 36 rests. At a location opposite the ramp 48, the piston 46 is provided with two cutouts 51, into each of which a roller or cylinder 50 has been inserted, freely rotatable, which cylinders 50 are supported by rolling off the interior wall of the chamber 39.

The function of the control of the pressure-relief valve arrangement 11 of the closure cap 10 is as follows: when the coupling element 61 with the hose 62 constituting a vacuum line to the engine compartment is snapped into the cylinder chamber 39 of the handle 13 of the closure cap 10, the shifting spring 49 is mechanically biased so that it, starting at the position in FIG. 1, pushes the piston 46 inward. By means of this the pressure member 36 is moved via the ramp 48 and the cylinder 38 in the direction of the arrow B1 (downward), so that the pressure-relief valve spring 28 is biased. In this way the valve body 22 is provided with an increased opening pressure.

Since a vacuum is created when the motor vehicle engine is started, the piston 46, which is conducted, sealed against pressure, in the chamber 39, is pulled in the direction of the arrow A2, because of which the piston 46 is pulled back into the position in accordance with FIG. 1. By means of this the pressure member 36 is moved in the direction of the arrow B2 (upward) by the action of the compression spring 28, so that the compression spring 28 is slightly relaxed. This results in a reduced opening pressure for the valve body 22, which customarily is set at approximately 1.4 bar. After the motor vehicle engine has been turned off, no vacuum is applied to the piston 46 anymore, so that the shifting spring 49 can then move the piston 46 again in the direction of the arrow A1 against the action of the spring 65. The pressure-relief valve spring 28 is tensed again in this way, so that an opening pressure, increased to approximately 2.0 bar, on the valve body 22 results. Because of this the valve body 22 can withstand a higher interior radiator, or container, pressure resulting from the residual heat of the turned-off engine.

If the coupling element 61 is uncoupled for opening the closure cap 10, for example for replenishing coolant, the shifting spring 49 is completely relaxed, so that the pressure-relief valve spring 28 automatically switches in the manner described above to the normal operation opening pressure of, for example 1.4 bar. If after the closure cap 10 has been screwed on again the coupling of the coupling element 61 with the closure cap 10 is forgotten, the lower normal operation opening pressure is automatically maintained, so that the motor vehicle can continue to be used.

A ratchet-like operating torsion protection device, or rotary connecting device 80, between the exterior element 12 and the interior element 14 with the exterior thread element 17, with which the pressure-relief valve arrangement 11 is connected, has a coupling element in the form of a coupling bolt 82. A ring of axial bores 84 is provided in an upper wall 83 of the exterior thread element 17 located opposite the axially movable coupling bolt 82 arranged in a circumferential area of the handle 13, into respectively one bore 84 of which the inner free end 90 of the coupling bolt 82 selectively enters for a rotary connection of the handle 13 and the exterior thread element 17. In this position the closure cap 10 can be removed from the radiator connector. The coupling bolt 82 is conducted, movable up and down on a bearing sleeve 88 maintained in the bore 86 of the handle 13, and its collar, which is fixed against relative movement, is acted upon by a compression spring 85 in the direction toward the bore rim 83. The coupling bolt 82, whose end 90 entering into the bore 84 has an inclined face 89 over approximately 180° of its circumferential area, can be turned to the left or right by 180° via a head slot 87 by means of a screwdriver in accordance with FIG. 2B. In this way the coupling bolt 82 is in engagement with the bore 84, corresponding to the position of the inclined face, when the handle 13 is turned to the right or left, while it can freely turn in the manner of a ratchet in the respectively opposite direction, which is achieved by the resilience of the coupling bolt 82 against the effects of the compression spring 85 acting on it.

In the second exemplary embodiment represented in FIGS. 3A, 3B, 4 and 5, the pressure member 136, facing away from the compression spring 128, is acted upon by an actuating spring 154, one end of which is supported on the pressure member 136, and the other end is supported centered on the inner wall of the handle 113. The center of the pressure member 136 is seated, axially movable, on a diaphragm 155, wherein the circumferential rim of the diaphragm 155 is clamped between the handle 113 and the exterior thread element 117. In comparison with the pressure member 36, this pressure member 136 has a larger surface viewed from above and projects essentially into the chamber 139 which is connected with the vacuum line to the engine.

Figure 4:
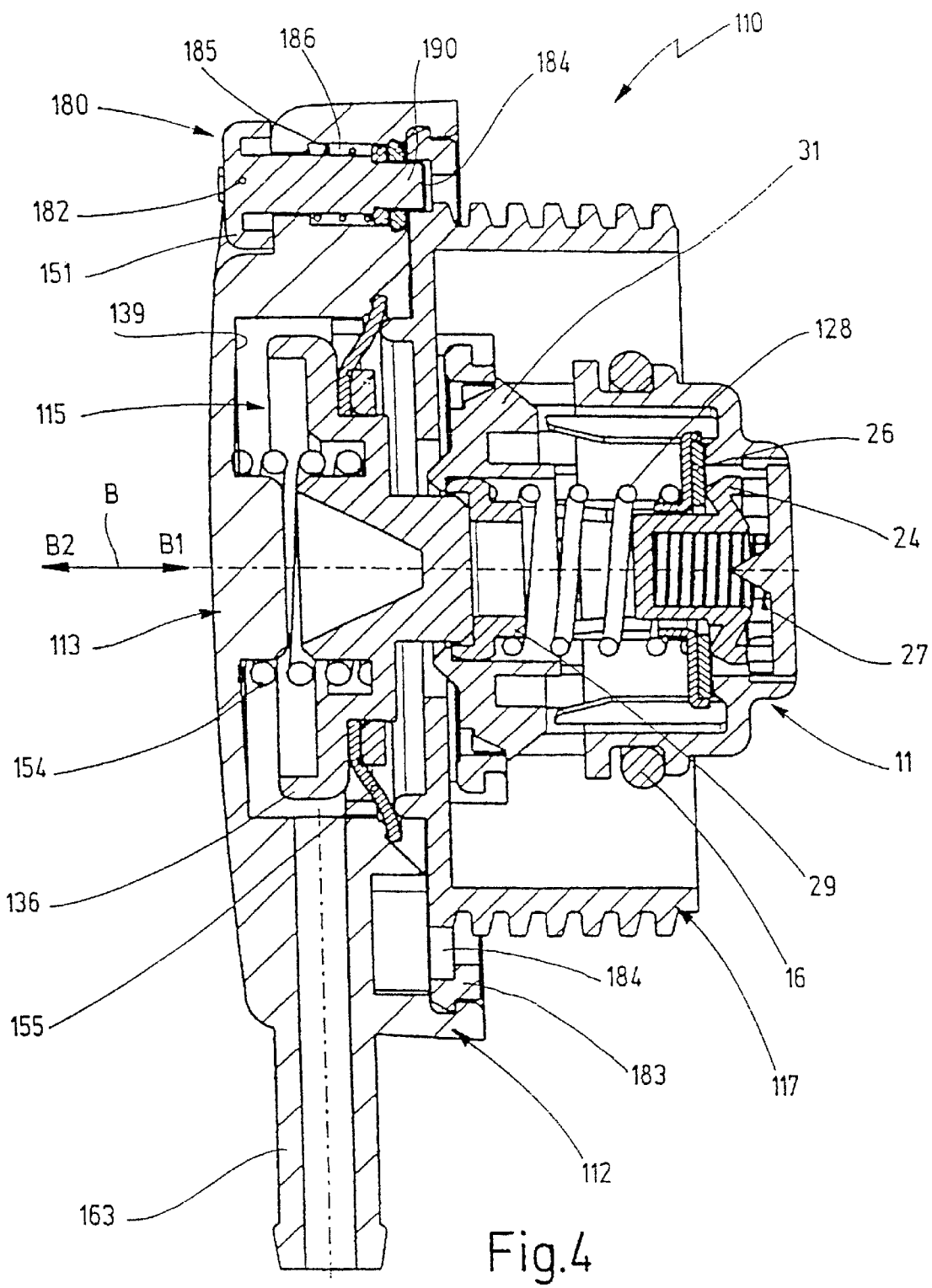
FIGS. 4 and 5, are schematic longitudinal sectional representations of a closure cap in accordance with a second exemplary embodiment in a first, or a second active position, FIGS. 6 and 7, correspond to FIGS. 4 and 5, but of a closure cap in accordance with a third exemplary embodiment of the present invention.
Figure 5:
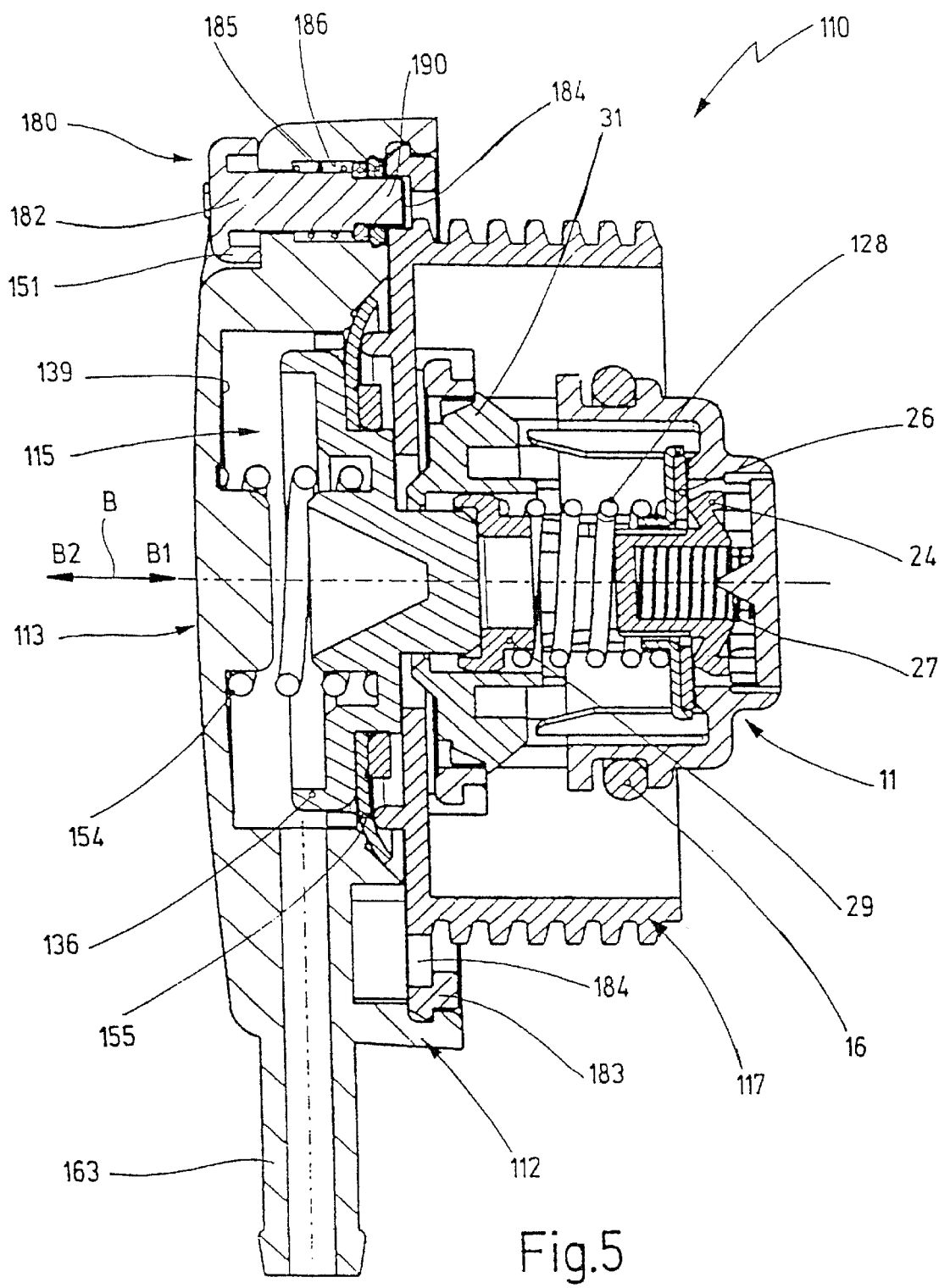

As with the first exemplary embodiment, when there is no vacuum in the chamber 139, and therefore none is applied to the pressure member 136, with the engine turned off, the actuating spring 154, which has a greater force than the compression spring 128, biases the latter, so that the valve body 122 can withstand an opening pressure of approximately 2.0 bar (FIG. 5). As soon as the engine is started, a vacuum occurs through the vacuum line in the chamber 139, and therefore acts on the pressure member 136, which has the result that the pressure member 136 is sucked into the vacuum chamber 139 against a stop represented in FIG. 4. The actuating spring 154 is tensed by this and the compression spring 128 relaxed, so that the valve body 122 only has to withstand an opening pressure of approximately 1.4 bar. This position remains as long as the engine runs and therefore creates a vacuum. When the engine is turned off, the restoration into the position in accordance with FIG. 5 takes place. In the course of this the diaphragm 155 provides a seal between the vacuum chamber 139 and the remainder of the closure cap space, or the interior of the radiator container, and furthermore an elastic movement connection, or arrangement, of the pressure member 136 inside the closure cap 110.

With the closure cap 110 represented in FIGS. 3 to 5, the handle 113 is provided with a fixed pipe element 163 for a hose, and not with a coupling member. Thus, with this exemplary embodiment a connection remains between the handle 113 and the hose, not represented here, while screwing the closure cap 110 on, or off the coolant reservoir connector.

To achieve the tight screwing, or release, of the closure cap 110 in case of such a fixed connection between the closure cap and the hose, the ratchet-like rotary connecting device 180 is provided between the exterior element 112 and the exterior thread element 117. As with the first exemplary embodiment, this ratchet connection 180 has a coupling bolt 182 which enters, urged by a spring, into one of many annularly arranged bores 184 in a circumferential rim 183 of the exterior thread element 117. The coupling bolt 182 is located inside an axial bore 186 provided with an undercut, wherein the compression spring 185 is provided inside the undercut. On its outer end, the bolt 182 is connected with a lever 151 (FIG. 3A) in a manner fixed against relative rotation, by means of which the coupling bolt can be moved back and forth over 180°. The inner end 190 of the coupling bolt 182 is provided with an inclined surface 189, which is arranged pointing to the left or the right, corresponding to the position of the lever 191 in accordance with FIG. 3B.

In this way the closure cap 110 (the same as the closure cap 10) can be screwed on the container connector or screwed off it by turning it back and forth, depending on the position of the lever 191. In other words, depending on the position of the lever 191, and therefore the position of the inclined face 189, a connection, fixed against relative rotation, between the handle 113 and the exterior thread element 117 exists in the one direction, while in the other direction a free-wheeling ratchet effect is achieved because the coupling bolt 182 can come out of the bore 184 against the action of the compression spring because of the inclined face 189 and the compression spring 185.

Figure 6:
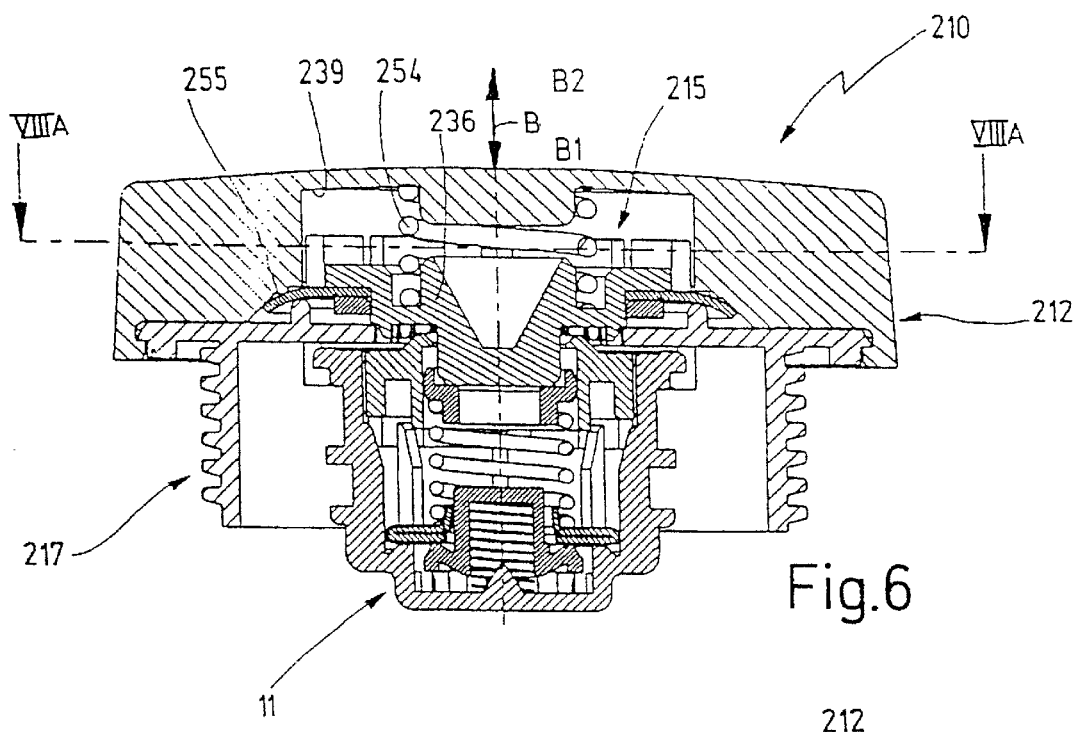
Figure 8A:
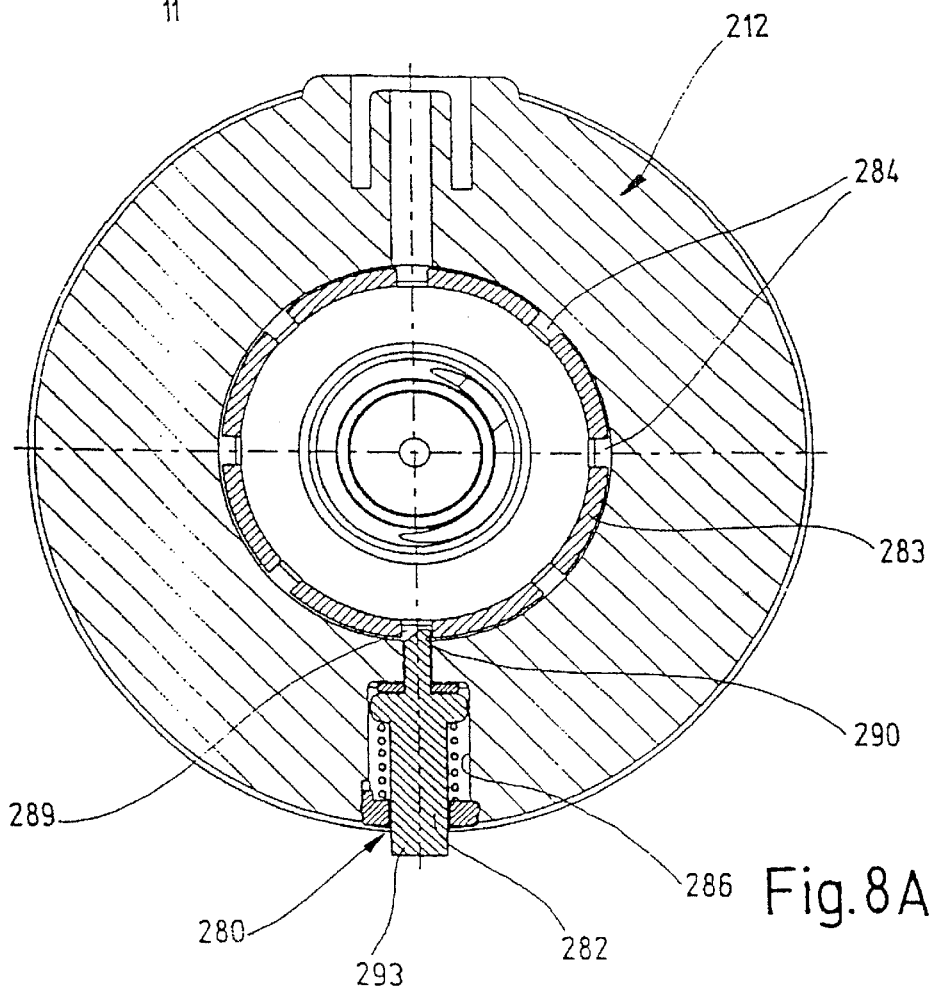
FIGS. 8A and 8B, is a section along the line VIIIA—VIIIA in FIG. 6, or a section along the line VIIIB—VIIIB in FIG. 7, and FIG. 9, is a schematic representation in longitudinal section of a closure cap for motor vehicle radiators in accordance with a fourth exemplary embodiment of the present invention in a first position.
Figure 7:
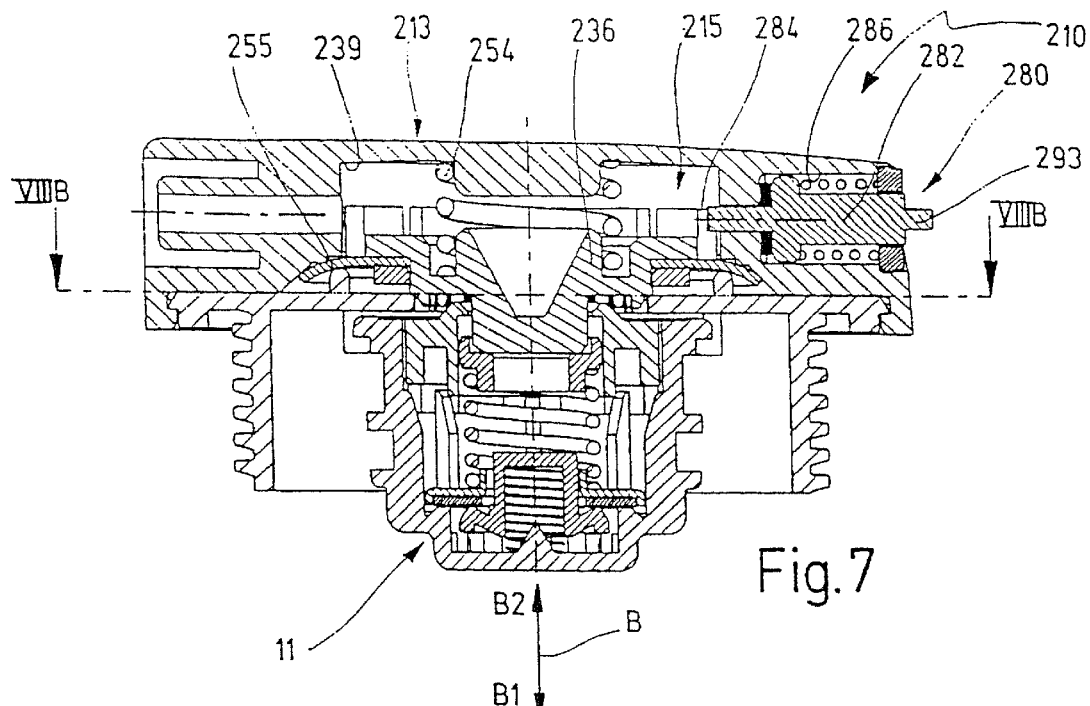
Figure 8B:
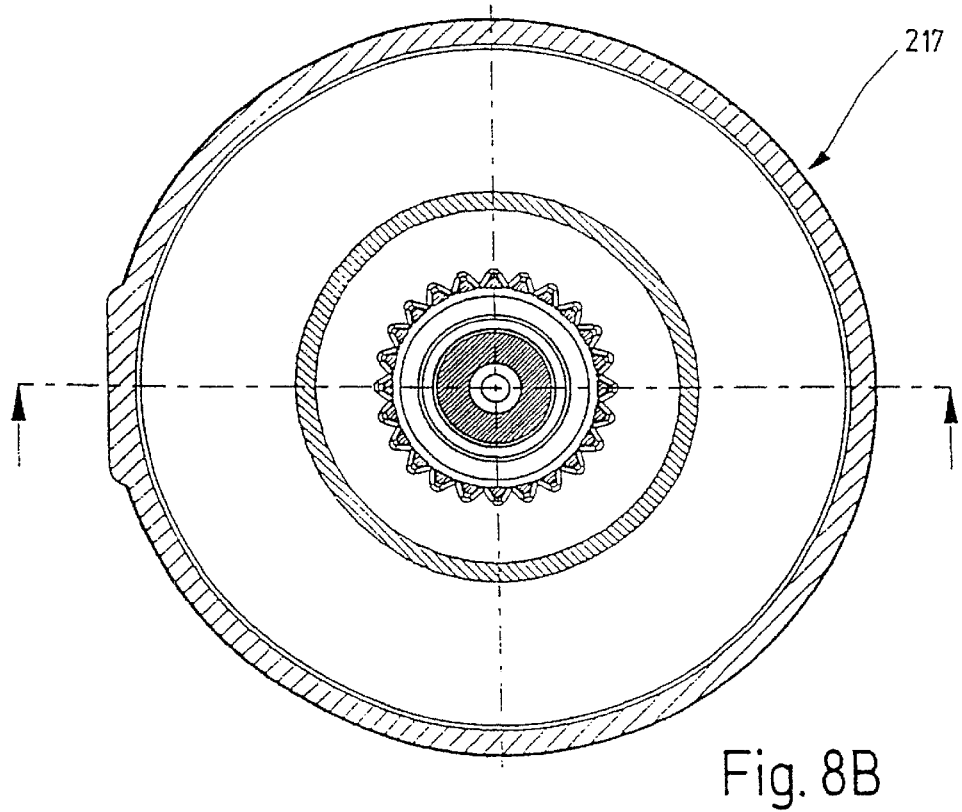

FIGS. 6 to 8 show a closure cap 210, whose function essentially corresponds to the closure cap 110 in accordance with FIGS. 3 to 5. The essential difference lies in the embodiment of the ratchet-like rotary connecting device 280 which, in the exemplary embodiment of claims 6 to 8, acts radially on a circumferential area. For this purpose the coupling bolt 282 is arranged spring-loaded in a bore 286, closed against the exterior, of the handle 213 in such a way that it is biased in a direction toward the interior, so that its end 290, which is provided with an inclined face 289, always engages a bore 284 of a collar, or ring 283 (FIG. 8B), which is provided with several such bores 284 and projects away from the interior element 214 and is connected with it, fixed against relative rotation. The outer end of the coupling bolt 282 is provided with gripping strip 293, by means of which the coupling bolt 282 can be turned by respectively 180° into the respective coupling position, i.e. for screwing it off or screwing it on.

The ratchet-like rotary connecting device 80, 180 or 280, represented in connection with the exemplary embodiments in FIGS. 1 and 2, 3 to 5 and 6 to 8 is, in accordance with one or several further exemplary embodiments not represented in the drawings, combined with a torsion protection device, which is controlled as a function of pressure or temperature. It is achieved by means of such a torsion protection device that a connection, which is fixed against relative rotation, between the handle 13, 113 or 213 and the exterior thread element 17, 117 or 217 is only provided when the temperature in the coolant reservoir is so low that there is no danger of scalding or other danger when the closing cap is unscrewed.

For example, the ratchet-like rotary connecting device 80, 180 and/or 280 is controlled as a function of the temperature in such a way that one end of the coupling bolt 82, 182, or 282 is acted upon by a temperature-dependent memory spring, and the other end by a restoring spring which, at a predetermined too high temperature in the coolant reservoir, cause the coupling bolt to be pushed out of the respective detent bore 84, 184, or 284, or to leave it.

Another variation of a torsion protection device controlled as a function of temperature consists in that the bore collar 83, 183, or 283 is controlled in the manner described in connection with the coupling bolt in such a way that it can be engaged, or disengaged, from the latter.

Figure 9:
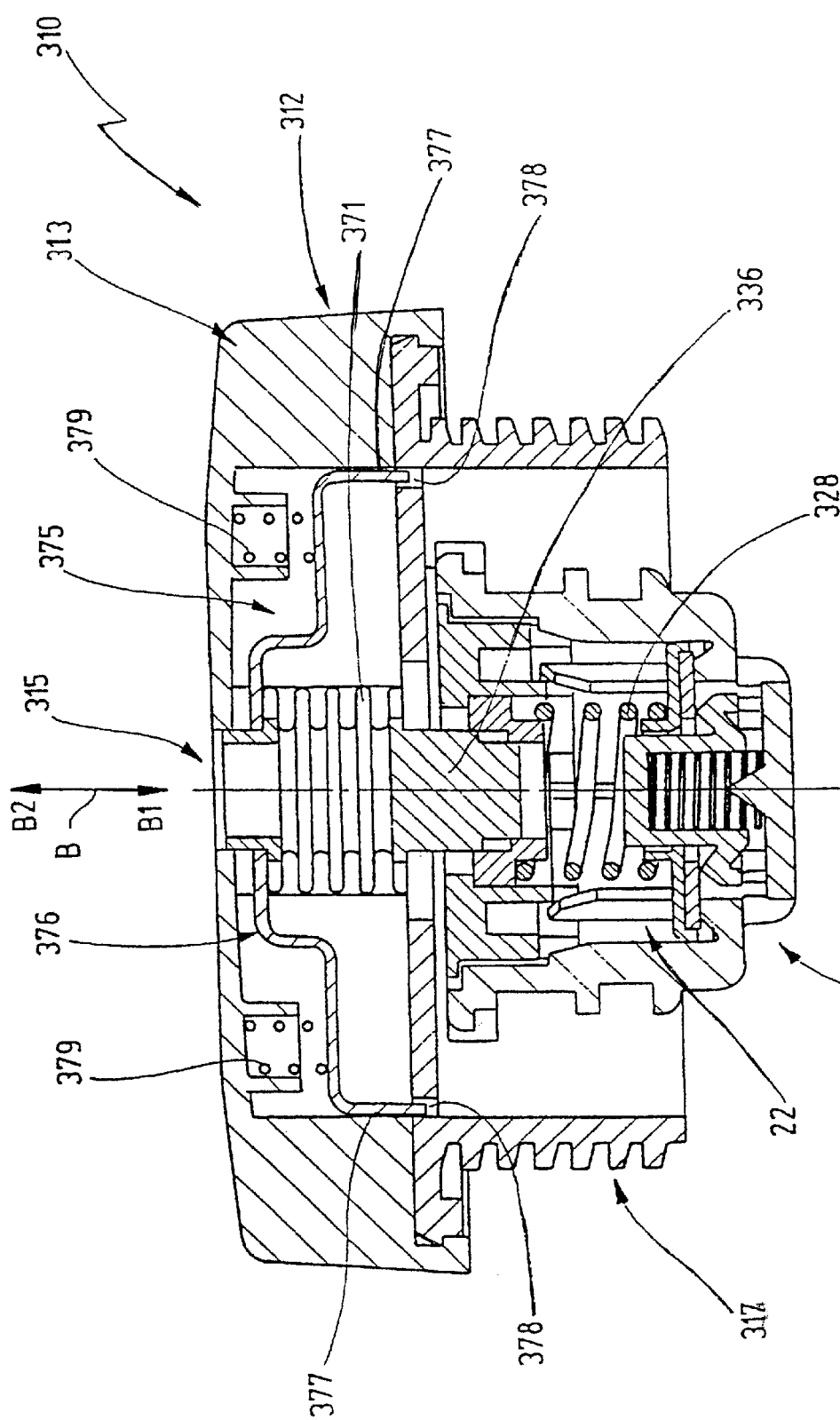

FIG. 9 shows a further embodiment of a closure cap 310. With this exemplary embodiment the drive mechanism 315 is arranged aligned, i.e. in an axially concentric orientation, with the compression spring 328 and is axially guided in the front face of the handle 313 of the closure cap 310. The drive mechanism 315 extending in the axial direction is electrically actuated. Electrical contacts 357 have been conducted to the outside for this purpose.

In accordance with a variation, the electrically actuated drive mechanism 315 is provided in the form of an expanding material, not represented in detail, with a PTC heating element as the heat source.

In accordance with another variation, also not represented in detail, the drive 315 is constituted by a sorption actuator, preferably a metal hydride actuator. With this drive mechanism a PTC heating element, for example, is also employed, by means of which the metal hydride in the actuator is electrically heated to a defined temperature. The pressure in the actuator arises in accordance with the temperature, so that the drive mechanism 315 expands and acts on the pressure member 336 for biasing the compression spring 328. If the electrical heating is stopped, the metal hydride in the actuator is cooled by exchanging heat with its surroundings, so that the pressure in the actuator drops, which results in a restoring movement and therefore relaxation of the compression spring 328. The effects on the pressure-relief arrangement 11 occur in the described manner.

A corresponding effect also results with the above described expansion material element as the electrical drive mechanism, wherein a wax which expands under heat is used. With both variations the actual drive element is enclosed in a bellows 371.

In the exemplary embodiment represented in FIG. 9, a torsion protection device 375, controlled as a function of temperature, is used in connection with the electrically actuated drive mechanism 315. The torsion protection device 375 is constituted by a hoop 376, which rests centered on the drive element 315, or its bellows 371 and, in the initial stage lies at a short distance from the inner wall of the handle 313. At both ends the hoop 376 extending radially inside the chamber 339 has two fingers 377, which are bent axially downward and enter into axial bores 378 of the exterior thread element 117. This initial state is represented in FIG. 9. Between its center, which extends over the bellows 371, and the fingers 377 at the end, the hoop 376 is acted upon by a compression spring 379. In the state represented, a rotary connection between the handle 313 and the exterior thread element 317 is provided, so that the closure cap 310 can be unscrewed, or screwed on.

The drive mechanism 315 will slightly extend axially when the engine is running, which causes the drive mechanism 315 to move upward in the direction of the arrow B2 because of the still too strong force of the compression spring 328, and to lift the blocking hoop 376 sufficiently far so that it comes to rest against the inner wall of the handle 313. In this state the blocking hoop 376 is lifted out of the bores 378, so that the connection, fixed against relative rotation, between the handle 313 and the exterior thread element 317 is released. If the engine is turned off, the temperature in the drive element 315 continues to increase because of the selected electrical coupling, which causes it to continue to expand in the axial direction. Because of its coming to rest against the inner wall of the handle 313, this has the result that the drive mechanism 315 expands downward in the direction in accordance with the arrow B1 and acts on the pressure member 336 opposite to the action of the compression spring 328 and therefore biases the latter to an opening pressure of approximately 2.0 bar. In this state, too, the free-wheeling connection between the handle 313 and the exterior thread element 317 is maintained, because the blocking loop 376 continues to remain in its uppermost position. The initial position in accordance with FIG. 9 is only achieved again after complete cooling.

In accordance with a further exemplary embodiment of the invention, not represented, a blocking loop represented in FIG. 9 is provided in the exemplary embodiments in accordance with FIGS. 3 to 5 and 6 to 8. There, the blocking loop is motionally connected with the pressure member 136, or 236, for example.

It is understood that such a closure cap can also be used with the compensation containers of cooling or heating systems or the same.

What is claimed is:

1. A closure cap for a stationary connector of a container, the container defining an interior, the closure cap comprising:
    an interior cap element having a seal seat and a flow connection between the container interior and the container exterior;
    a valve arrangement for opening and blocking said flow connection, said valve arrangement having a valve body, which can be moved back and forth, and is biased in the direction toward the container interior against said seal seat so that it can lift off said seal seat when a threshold value of the interior pressure in the container is exceeded; and
    a controlled drive mechanism, wherein:
        said bias can be set by means of said controlled drive mechanism; and
        said drive mechanism is vacuum-controlled.

2. The closure cap in accordance with claim 1, further comprising:
    a pressure member, wherein:
        said controlled drive mechanism has an element, which transfers the drive motion to said pressure member.

3. The closure cap in accordance with claim 2, wherein:
    said controlled drive mechanism comprises a piston-cylinder unit, whose piston is maintained between two springs at the ends and is provided with a ramp facing said pressure member.

4. The closure cap in accordance with claim 3, further comprising:
    a roller element arranged between said ramp of said piston and said pressure member.

5. The closure cap in accordance with claim 1, wherein:
    said controlled drive mechanism comprises an arrangement, which has a spring-loaded diaphragm, whose axial movement biases said valve body.

6. The closure cap in accordance with claim 5, further comprising:
    a diaphragm;
    an exterior element;
    an exterior thread element, which is biased by means of a compression spring supported on a handle, wherein:
        said pressure member is clamped axially movable by means of said diaphragm between said exterior element and said exterior thread element.

7. The closure cap in accordance with claim 1, wherein:
    said vacuum-controlled drive mechanism is, connected with a hose leading to the engine of a motor vehicle.

8. The closure cap in accordance with claim 7, wherein:
    said handle is provided with a fixed hose connection element.

9. The closure cap in accordance with claim 8, further comprising:
    a ratchet-like rotary connecting device provided between said handle and said exterior thread element, which can be set as a function of the direction of rotation.

10. The closure cap in accordance with claim 9, wherein:
    said ratchet-like rotary connecting device is axially arranged.

11. The closure cap in accordance with claim 9, wherein:
    said ratchet-like rotary connecting device is radially arranged.

12. The closure cap in accordance with claim 9, wherein:
    said handle has a recess; and
    said ratchet-like rotary connecting device has a coupling bolt, which is maintained resiliently movable in its axial direction said a recess of said handle.

13. The closure cap in accordance with claim 12, wherein:
    one side of an end of said coupling bolt, which enters into said exterior thread element is provided with an inclined face and is rotated in its recess, preferably over an angle of $+/-180°$.

14. The closure in accordance with claim 13, wherein:
    said coupling bolt is connected, fixed against relative rotation, with a rotary lever.

15. The closure cap in accordance with claim 13, wherein:
    said exterior thread element has a collar with bores, which is engaged by said coupling bolt.

16. The closure cap in accordance with claim 1, further comprising:
    a spring, and wherein:
        facing away from said controlled drive mechanism said valve body is biased by said spring which, on its end facing away from said valve body, is supported on said pressure member, which is axially movable by means of said controlled drive mechanism.

17. A closure cap for a stationary connector of a container, the container defining an interior, the closure cap comprising:
    an interior cap element having a seal seat and a flow connection between the container interior and the container exterior;
    a valve arrangement for opening and blocking said flow connection, said valve arrangement having a valve body, which can be moved back and forth, of the valve arrangement and is pushed with a bias in the direction toward the container interior against said seal seat in such a way that it can lift off said seal seat when a threshold value of the interior pressure in the container is exceeded; and
    an electro-chemically controlled drive mechanism, wherein:
        said bias can be set by means of said electro-chemically controlled drive mechanism; and
        said electro-chemically controlled drive mechanism comprises an electrically heatable sorption actuator.

18. The closure cap in accordance with claim 17, wherein:
    said electrically heatable sorption actuator is a metal hydride actuator.

19. The closure cap in accordance with claim 17, wherein:
    said electro-chemically controlled drive mechanism is provided with a PCT heating element.

20. The closure cap in accordance with claim 17, wherein:
    said electro-chemically controlled drive mechanism includes a bellows in which an element which can be expanded by heat is arranged.

21. The closure cap in accordance with claim 17, further comprising:

a torsion protection device;

a handle; and an exterior thread element having cutouts, wherein:
said torsion protection device is controlled as a function of temperature and is arranged between said handle and said exterior thread element.

22. The closure cap in accordance with claim 21, wherein:
said torsion protection device has a hoop, which is connected to move together with said electro-chemically controlled drive mechanism, and has end fingers which penetrate into said cutouts of said exterior thread element.

23. The closure cap in accordance with claim 22, wherein:
said hoop is coupled to move together with said bellows.

24. The closure cap in accordance with claim 22, further comprising:
a spring, and wherein:
said bellows is acted upon by said spring.

25. The closure cap in accordance with claim 21, further comprising:
a ratchet-like rotary connecting device, and wherein:
said torsion protection device is integrated into said ratchet-like rotary connecting device.

26. The closure cap in accordance with claim 17, further comprising:
a spring; and
a pressure member, and wherein:
facing away from said electro-chemically controlled drive mechanism said valve body is biased by said spring which, on its end facing away from said valve body, is supported on said pressure member, which is axially movable by means of the controlled electro-chemically controlled drive mechanism.

* * * * *